United States Patent [19]

Justus

[11] 4,396,502
[45] Aug. 2, 1983

[54] SCREENING APPARATUS FOR A PAPERMAKING MACHINE

[75] Inventor: Edgar J. Justus, Beloit, Wis.

[73] Assignee: Beloit Corporation, Beloit, Wis.

[21] Appl. No.: 359,318

[22] Filed: Mar. 18, 1982

[51] Int. Cl.³ .............................................. B07B 1/20
[52] U.S. Cl. .................................. 209/273; 209/284; 209/306; 209/415
[58] Field of Search ............... 209/273, 284, 255, 300, 209/306, 305, 370, 379; 210/415; 55/406, 400

[56] References Cited

U.S. PATENT DOCUMENTS

| | | | |
|---|---|---|---|
| 190,202 | 5/1877 | Feistel | 209/284 |
| 2,900,077 | 8/1959 | Sandison | 209/300 |
| 3,261,468 | 7/1966 | Dick | 209/243 |
| 3,363,759 | 1/1968 | Clarke-Pounder | 209/273 |
| 3,497,060 | 2/1970 | Tra et al. | 209/379 X |
| 3,713,541 | 1/1973 | Nelson | 210/415 |
| 3,928,188 | 12/1975 | Link et al. | 209/273 X |
| 4,111,799 | 9/1978 | Cancilla | 209/273 |
| 4,126,513 | 11/1978 | Justus et al. | 162/380 |
| 4,188,286 | 2/1980 | Holz | 209/273 |
| 4,193,865 | 3/1980 | Aario | 209/240 |
| 4,213,823 | 7/1980 | Wittig et al. | 162/380 |
| 4,252,641 | 2/1981 | Martin | 209/273 |

FOREIGN PATENT DOCUMENTS 2051600 1/1981 United Kingdom ............... 209/273

*Primary Examiner*—Kathleen J. Prunner
*Attorney, Agent, or Firm*—Hill, Van Santen, Steadman, Chiara & Simpson

[57] ABSTRACT

A screen apparatus for processing stock flowing into a papermaking headbox which includes a cylindrical housing, a tubular screen mounted longitudinally within the housing, and inlet means for introducing a stock suspension into the housing for flow through the screen. Outlet means are provided for receiving the suspension passing through the tubular screen for delivery to the headbox. The improvement of the present invention provides a helical slot in the housing which discharges stock passing through the screen into the outlet means. Foil means mounted for rotation coaxially with the cylinder are provided which create a pressure pulsation to cause a dispersal of the fibers and aid in the screening operation.

8 Claims, 4 Drawing Figures

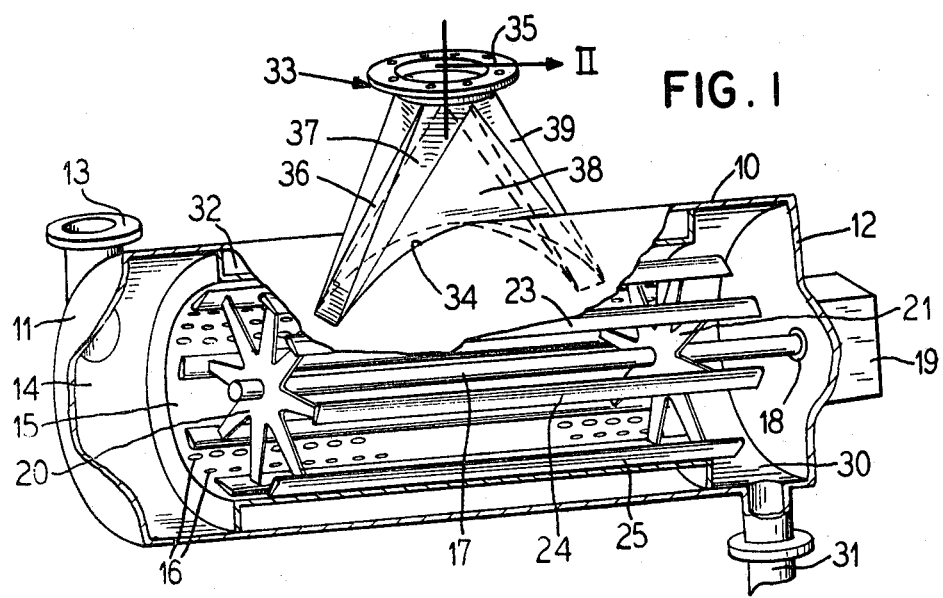
FIG. 1
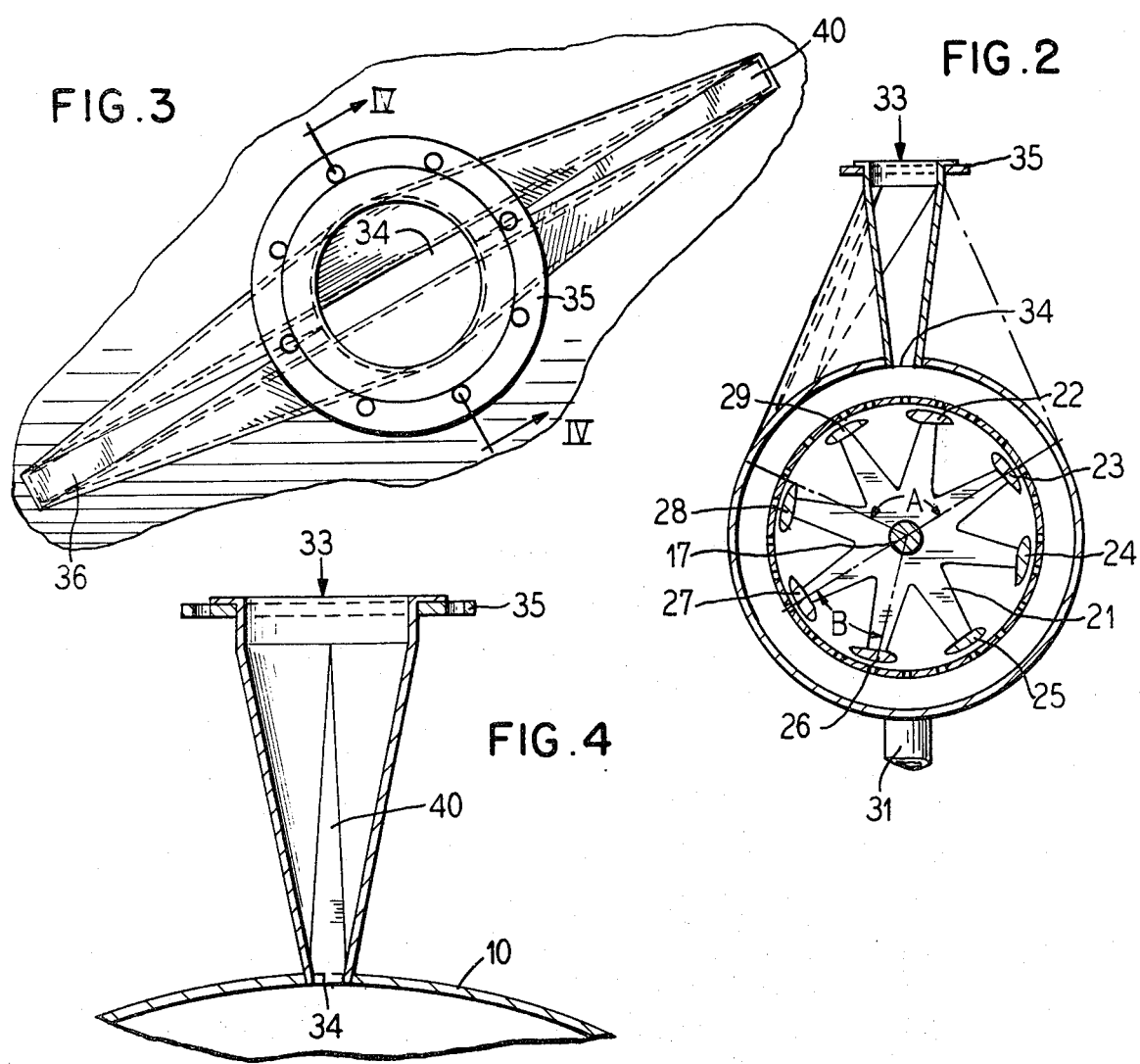
FIG. 2
FIG. 3
FIG. 4

SCREENING APPARATUS FOR A PAPERMAKING MACHINE

BACKGROUND OF THE INVENTION

1. Field of the Invention

This invention is in the field of foil type papermaking machine screens and is designed to reduce the generation of abrupt pressure pulses which eventually manifest themselves in a non-homogeneous distribution of fibers from the headbox. Specifically, the present invention provides an improved foil type screen assembly including a plurality of rotating foils which cooperate with a helical slot provided in the housing to reduce the amplitude of discrete pressure pulses which are frequently encountered in foil type screens.

2. Description of the Prior Art

Stock screens are used in the papermaking process for at least partially cleaning the stock before it flows to the headbox where it is dewatered to form a paper web. Such stock screens are conventionally tubular in shape with the stock being directed either to the inner surface or the outer surface of the tubular screen with the desired fibers flowing through the screen and the rejected stock material including sheaves, particles, dirt, knots, and like being rejected by the screen and being removed through a reject line. In the case where the supply stock is delivered to the inside of the screen and the stock flows outwardly through the screen, the stock to be screened may be admitted by flowing in at one end of the tubular screen, and the rejects flow out of the other end. The acceptable material is received by a discharge from an annular chamber about the screen. Such devices are shown, for example, in U.S. Pat. No. 4,111,799 directed to a horizontally disposed stock screen assembly, and U.S. Pat. No. 4,126,513 directed to a vertically extending stock screen assembly. In each of the assemblies described in these patents, stock pulsing foils extend substantially the entire effective length of the screen. The foils rotate at a uniform velocity over the surface of the screen to cause relatively low frequency, high amplitude pressure pulsations. Such pressure pulsations are necessary for the satisfactory operation of the screen, but they introduce corresponding pressure pulsations in the stock delivery to the headbox. Such pulsations, as previously noted, disturb uniform distribution of the stock and have an adverse effect on flow of the stock through the slice opening onto the web-forming surface. It is essential for satisfactory high speed operation and good formation that the pulse fluctuations be substantially eliminated or produced at a satisfactory high frequency, to avoid machine direction instability of the stock flow onto the web-forming surface such as a fourdrinier wire and to at least reduce the possibility of causing a basis weight variation in the machine direction.

A further improvement in the foil type papermaking machine screen has been directed and claimed in U.S. Pat. No. 4,213,823. The apparatus described in this patent uses a set of staggered foils which extend from opposite ends of the screen and have their inner end portions alternating in circumferentially spaced but axially overlapping relation. The frequency of the hydraulic pulses transmitted to the outlet is increased, but the total amplitude of the foil pulses transmitted to the outlet pipe is reduced without significantly changing the horsepower requirements for driving the foil.

U.S. Pat. No. 3,261,468 describes a screen cleaning device for fibrous pulp suspensions consisting of at least one elongated foil supported for movement in a circular path about the axis of the screen and across the face thereof, the clearance between the foil and the adjacent screen face varying from the supported end to the free end of the foil so that as the foil bends under the influence of centrifugal force, it serves to clean the screen.

U.S. Pat. No. 3,713,541 relates to a machine for screening liquid fiber suspensions wherein the screen is provided with elongated slots disposed along the flow path of the suspension, the slots being arranged in a series with the slots in any given series being parallel to each other but at substantial angles to slots located in other series.

Screening apparatus utilizing a rotor which has a cylindrical wall having elevations for producing positive and negative pulse pressure thrusts is described in U.S. Pat. No. 4,188,286.

A blade type classifying apparatus for a stock suspension is described in U.S. Pat. No. 4,193,865. This patent describes a screen drum including inclined blades which bear against the screen drum at an angle to the axis of the drum and serve to sweep the surface of the drum during rotation.

In U.S. Pat. No. 4,252,641 there is described a screen assembly in which the axes of the cylindrical screen plate and the casing surrounding the plate are offset with respect to each other to form an enlargement in the annular chamber surrounding the screen plate. A partition is provided in the enlargement extending from the inlet opening to the opening at which the rejects appear. A baffle is provided which circles the screen plate helically and is substantially coextensive with the partition to provide a passage of decreasing cross-sectional area as it approaches the outlet for rejects.

SUMMARY OF THE INVENTION

The present invention provides a screen apparatus for processing stock flowing to a papermaking headbox. In general, it includes a cylindrical housing, and a tubular screen mounted longitudinally within the housing. An inlet means is provided for introducing a stock suspension into the housing for flow through the screen. An outlet means receives the suspension passing through the tubular screen for delivery to the headbox. One of the features of the invention is the provision of a helical slot formed in the housing which discharges stock passing through the screen into the outlet. The screen apparatus is also provided with foil means mounted for rotation coaxially with the axis of the cylinder. In the preferred form of the invention, the helical slot extends for more than 75% of the length of the foils.

BRIEF DESCRIPTION OF THE DRAWINGS

A further description of the present invention will be made in conjunction with the attached sheet of drawings in which:

FIG. 1 is a view partly in elevation and partly in cross section illustrating a screen apparatus according to the present invention;

FIG. 2 is a cross-sectional view taken substantially along the line II—II of FIG. 1;

FIG. 3 is a plan view of the outlet of the screen assembly; and

FIG. 4 is a cross-sectional view taken substantially along line IV—IV of FIG. 3.

DESCRIPTION OF THE PREFERRED EMBODIMENTS

Referring to FIG. 1, reference numeral 10 has been applied to a cylindrical housing closed at each end by means of end walls 11 and 12. A supply inlet 13 introduces stock under pressure into the interior of the housing 10. The stock enters the housing into a supply chamber 14 and then proceeds to flow through a screen 15 equipped with perforations 16. The perforations are selected so as to pass fibers of acceptable size and to reject non-acceptable fibers along with foreign material such as dirt, sheaves, and knots.

Mounted coaxially with the axis of the housing 10 is a shaft 17 mounted for rotation within a bearing 18 and driven by a motor 19. The shaft carries a spaced pair of spiders, one spider 20 being at the inlet end and the other spider 21 being at the outlet end. These radially extending spiders 20 and 21 have arms spaced approximately 45° apart, as shown in FIG. 1. Supported between the spiders 20 and 21 are a plurality of foils 22 through 29 which have an airfoil shape in cross section. As the foils move along the surface of the screen 15, they generate pressure pulsations which aid in the screening operation. As illustrated in FIG. 1, the foils extend substantially the full length of the screen 15. The stock flows along the length of the screen with the acceptable stock and fibers passing through the openings 16 and the rejects flow to an annular reject chamber 30 located between the end of the foil means and the end wall 12. The rejects are eliminated through a discharge conduit 31.

The stock which passes through the perforations 16 accumulates in an annular chamber 32 disposed between the screen 15 and the cylindrical wall of the housing 10.

The outlet for the screened stock suspension is generally indicated at reference numeral 33, and is positioned centrally of the screen 15. The stock is discharged from the annular chamber 32 under pressure through a helical slot 34 which extends at least 75% of the axial extent of the foils, and preferably a full 100% of the foil length.

The outlet 33 includes a circular flange 35 which is arranged to be connected to a flange (not shown) of a conduit leading to the papermaking headbox. The circular discharge opening in the flange 35 has a substantially greater diameter than the width of the slot 34. To couple the helical slot 34 to the circular discharge opening, there is provided a transition section which in the illustrated form of the invention consists in alternating straight and curved pieces. For example, there is a straight triangular piece 36 followed by a curved piece 37, a relatively large straight triangular piece 38, a curved triangular piece 39, a straight triangular piece 40, and so on. The transition section is secured to the housing 10 tangentially, as illustrated in FIG. 2. Also, the angle A formed between the points of tangency is much larger than angle B which is the angle included between two adjacent foils, and is preferably about $2\frac{1}{2}$ times the angle B.

The presence of the helical slot 34 minimizes the abruptness of the pressure pulses generated by the foils 22 through 29. The amplitude of the pulses created in the stock is thereby reduced, and with it the tendency to cause non-homogeneous deposition.

Through the use of the helical outlet slot, the foils may be straight and less costly to manufacture than foils which are of a helical configuration.

It should be evident that various modifications can be made to the described embodiments without departing from the scope of the present invention.

I claim as my invention:

1. A screen apparatus for processing stock flowing to a papermaking headbox comprising:
   a cylindrical housing,
   a tubular screen mounted longitudinally within said housing,
   inlet means for introducing a stock suspension into said housing for flow through said screen,
   outlet means receiving the suspension passing through said tubular screen for delivery to said headbox,
   said housing having a helical slot formed therein which discharges stock passing through said screen into said outlet means, and
   foil means mounted for rotation coaxially with the axis of said cylinder.

2. A screen apparatus according to claim 1 in which: said slot extends for at least 75% of the length of the foil means.

3. A screen apparatus according to claim 2 in which: said foil means includes a rotatable shaft and foils supported radially from said shaft, said foils being spaced approximately 45° apart.

4. A screen apparatus according to claim 1 in which: said foil means extends the full width of said tubular screen.

5. A screen apparatus according to claim 1 in which: said outlet means is positioned centrally of said screen.

6. A screen apparatus according to claim 1 in which: said outlet means has a circular discharge opening of substantially greater diameter than the width of said slot.

7. A screen apparatus according to claim 1 in which: the inner wall of said housing and the outer wall of said tubular screen are separated by an annular chamber.

8. A screen apparatus according to claim 1 in which: said outlet means is secured to said housing along spaced tangential lines, the angle included between said tangential lines being substantially greater than the angle included between two adjacent foil means.

* * * * *